(12) United States Patent
Rooke et al.

(10) Patent No.: US 9,688,011 B2
(45) Date of Patent: Jun. 27, 2017

(54) HIGH PRESSURE GAS HOSE AND METHOD OF MAKING SAME

(71) Applicant: Titeflex Commercial, Inc., Springfield, MA (US)

(72) Inventors: Gregory P. Rooke, Springfield, MA (US); Michael Fonfara, Chicopee, MA (US)

(73) Assignee: Titeflex Commercial, Inc., Springfield, MA (US)

( * ) Notice: Subject to any disclaimer, the term of this patent is extended or adjusted under 35 U.S.C. 154(b) by 125 days.

(21) Appl. No.: 14/334,228

(22) Filed: Jul. 17, 2014

(65) Prior Publication Data
US 2016/0018028 A1    Jan. 21, 2016

(51) Int. Cl.
*F16L 9/14* (2006.01)
*B29C 47/06* (2006.01)
(Continued)

(52) U.S. Cl.
CPC ........ *B29C 47/065* (2013.01); *B29C 47/0023* (2013.01); *B32B 1/08* (2013.01); *B32B 27/08* (2013.01); *B32B 27/12* (2013.01); *B32B 27/20* (2013.01); *B32B 27/322* (2013.01); *F16L 11/08* (2013.01); *B29K 2027/18* (2013.01); *B29K 2507/04* (2013.01); *B29K 2995/0065* (2013.01); *B29L 2023/005* (2013.01); *B32B 2262/101* (2013.01); *B32B 2264/108* (2013.01);
(Continued)

(58) Field of Classification Search
CPC . B29C 47/065; F16L 11/00; B29K 2995/0065

USPC ............. 138/137, 141, 140; 428/36.1, 36.91
See application file for complete search history.

(56) References Cited

U.S. PATENT DOCUMENTS 4,478,898 A   10/1984  Kato
7,122,585 B2  10/2006  Nicholl et al.
(Continued)

FOREIGN PATENT DOCUMENTS

EP         1741549 A1    1/2007
WO    WO 2013/165452    11/2013

OTHER PUBLICATIONS

Search Report and Written Opinion dated Sep. 24, 2015 for PCT Application No. PCT/US2015/040925 filed Jul. 17, 2015, 15 pages.

*Primary Examiner* — Patrick F Brinson
(74) *Attorney, Agent, or Firm* — Patterson Thuente Pedersen, P.A.

(57) ABSTRACT

A high pressure gas hose and related methods of transporting high pressure gases in which gas permeability throughout a length of the high pressure gas hose is reduced. The high pressure gas hose can have an outer tube and the inner tube. The outer tube can be formed of a resistant polymer material such as PTFE. The inner tube can include a matrix formed of PTFE and graphene nano-platelets or nano-particles. The graphene nano-platelets define a tortuous path within the matrix such that gas permeability is reduced through an inner tube wall thickness. Gas permeability throughout a length of the high pressure gas hose can be less that about 20 ml/m/hr. The high pressure gas hose can find practical application in natural gas applications, automotive applications, cooling and refrigeration applications and other applications in which it is desired to have low gas permeability in high pressure applications.

23 Claims, 4 Drawing Sheets

(51) Int. Cl.
*F16L 11/08* (2006.01)
*B29C 47/00* (2006.01)
*B32B 27/08* (2006.01)
*B32B 27/12* (2006.01)
*B32B 27/20* (2006.01)
*B32B 27/32* (2006.01)
*B32B 1/08* (2006.01)
F16L 11/04 (2006.01)
B29K 27/18 (2006.01)
B29K 507/04 (2006.01)
B29L 23/00 (2006.01)
F16L 11/00 (2006.01)

(52) U.S. Cl.
CPC . *B32B 2307/3065* (2013.01); *B32B 2307/714* (2013.01); *B32B 2307/7242* (2013.01); *B32B 2597/00* (2013.01); *F16L 11/00* (2013.01); *F16L 2011/047* (2013.01)

(56) References Cited

U.S. PATENT DOCUMENTS

| | | | |
|---|---|---|---|
| 7,604,049 B2 | 10/2009 | Vaidya et al. | |
| 7,623,340 B1* | 11/2009 | Song | B82Y 30/00 361/502 |
| 7,875,219 B2* | 1/2011 | Zhamu | H01G 9/058 264/109 |
| 8,096,353 B2* | 1/2012 | Ver Meer | E21B 33/1208 166/244.1 |
| 8,283,025 B2 | 10/2012 | Zhu | |
| 8,561,707 B2 | 10/2013 | Jin et al. | |
| 8,590,627 B2 | 11/2013 | Jin et al. | |
| 2006/0137757 A1 | 6/2006 | McKeen et al. | |
| 2008/0023396 A1 | 1/2008 | Fugetsu | |
| 2008/0302437 A1 | 12/2008 | Lovett et al. | |
| 2009/0005499 A1 | 1/2009 | Fisher et al. | |
| 2009/0036605 A1* | 2/2009 | Ver Meer | E21B 33/1208 525/55 |
| 2010/0129625 A1 | 5/2010 | Zhu | |
| 2011/0186786 A1* | 8/2011 | Scheffer | H01B 1/24 252/510 |
| 2011/0220348 A1 | 9/2011 | Jin et al. | |
| 2011/0272641 A1 | 11/2011 | Bastiaens et al. | |
| 2013/0274376 A1 | 10/2013 | Moorlag et al. | |
| 2013/0338606 A1 | 12/2013 | Conzone et al. | |
| 2014/0070465 A1 | 3/2014 | Kizer et al. | |
| 2014/0076340 A1 | 3/2014 | Kizer et al. | |
| 2014/0106257 A1 | 4/2014 | Raychaudhuri et al. | |

* cited by examiner

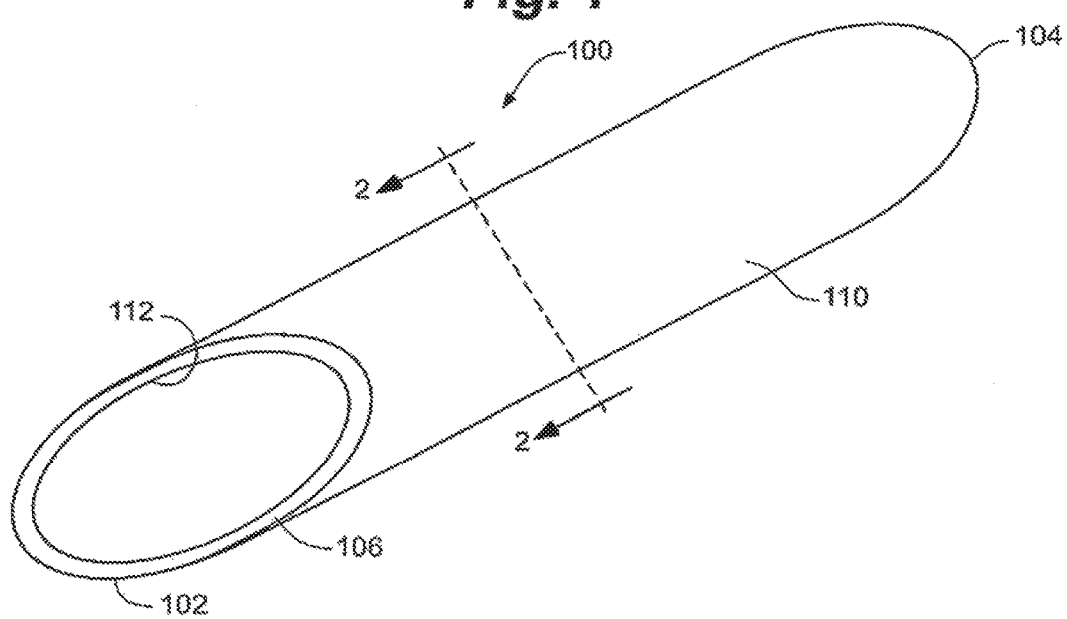

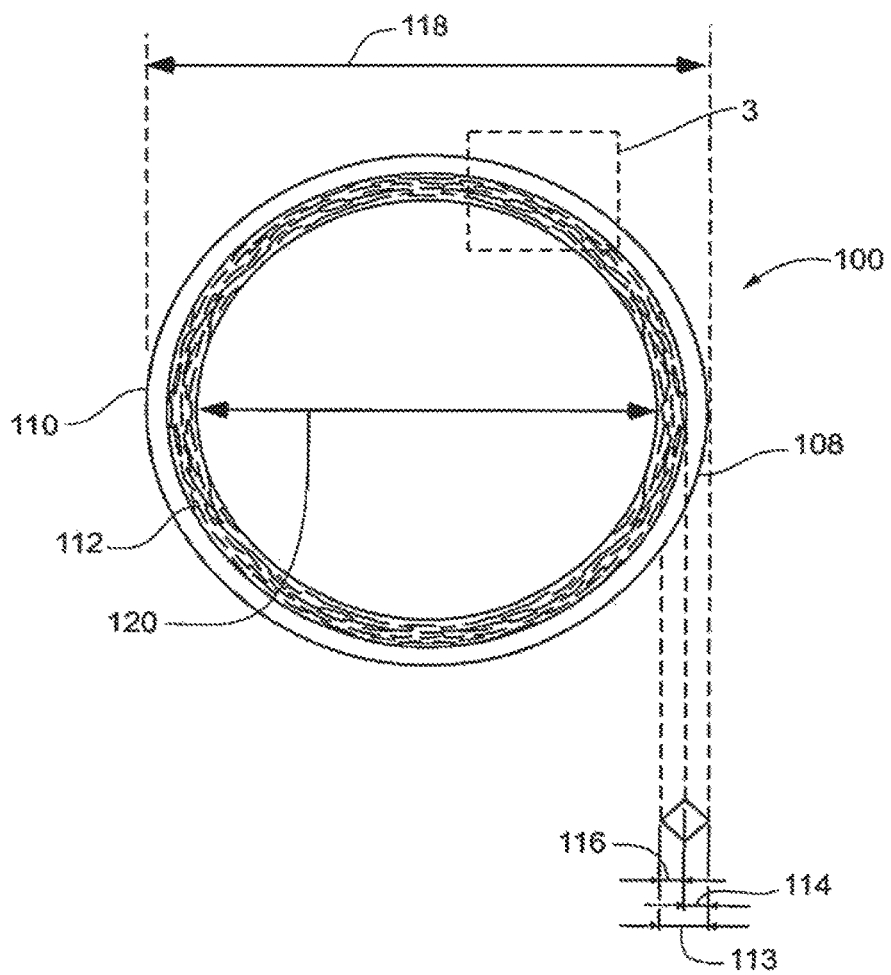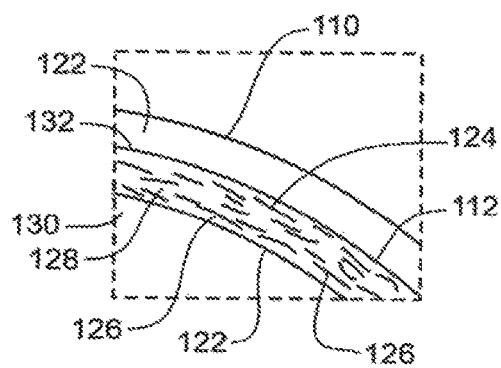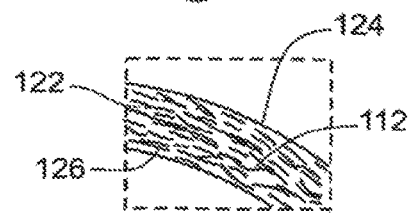

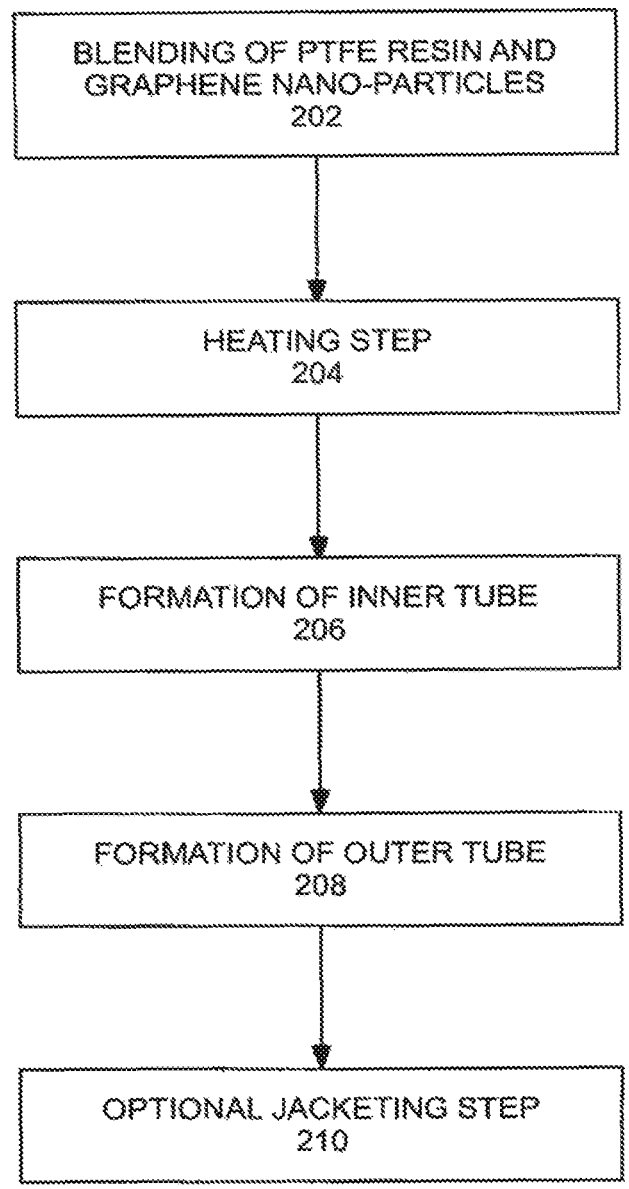

HIGH PRESSURE GAS HOSE AND METHOD OF MAKING SAME

FIELD OF THE INVENTION

The present invention is directed to fluoropolymer hoses such a polytetrafluoroethylene (PTFE) hoses, perfluoroalkoxy copolymer (PFA) or fluorinated ethylene propylene (FEP). More specifically, the present invention is directed to fluoropolymer hoses with reduced permeability PTFE hose for use in high pressure gas and vapor applications.

BACKGROUND OF THE INVENTION

Gases such as, for example, bottled industrial gases (nitrogen, argon, oxygen), refrigerants and natural gas, are frequently transported at high pressure, often exceeding 2000 PSIG. For example, bottled industrial gases are frequently at pressures exceeding 2800 PSIG and specialty bottled gases can be over 6000 PSIG. At natural gas fueling installations, natural gas can be supplied to vehicles at pressures exceeding 4000 PSIG. The molecules of natural gas are small, enhancing its ability to permeate through standard rubber or PVC hose constructions used for low pressure fluids, and the permeation of the gas is more rapid as the working pressure increases, which can cause natural gas accumulation with potentially dangerous consequences.

Traditionally, these gases have been transported in lower permeability tubing, such as hard tubing formed of metals or metallic alloys such as, for example, steel, stainless steel, copper and the like or using polymeric tubing such as, for example, nylon tubing. Such tubing must meet certain standards, such as ANSI, ASTM, and/or Underwriter Laboratories (UL®) requirements, to be used for distribution of high pressure gases. For example, hoses used for distribution of natural gas should have a maximum permeability rate of about 20 ml/m/hr.

However, conventional high pressure tubing suffers from drawbacks. For example, metallic tubing can fatigue or corrode over time, which results in catastrophic failure. Polymer hose and tubing such as, for example, Nylon tubing, on the other hand, while typically not subject to catastrophic failure, has the potential for kink formation. Furthermore, polymer hoses can degrade over time, causing an increase in their permeability until the tubing is no longer adequate for use with high pressure gases, i.e. the maximum permeability rate has been exceeded, which can go undetected. In addition, polymeric hoses many not be compatible with high temperatures such as, for example, those found in automotive applications, or low temperature conditions as found in some gas depressurizing applications. As such, it would be advantageous to improve upon existing hose and tubing options for use in transporting high pressure gases.

SUMMARY OF THE INVENTION

Generally, a high pressure gas hose of the present invention overcomes the deficiencies of the prior art by using an inner tube designed to have a reduced gas permeability throughout a length of the inner tube. Generally, the high pressure gas hose can comprise an outer tube and the inner tube. The outer tube can be formed of a resistant polymer material such as, for example, PTFE. The inner tube can comprise a matrix formed of PTFE and graphene nano-platelets or nano-particles. The graphene nano-platelets can comprise a tortuous path within the matrix such that gas permeability is reduced through an inner tube wall thickness. In some embodiments, gas permeability throughout a length of the high pressure gas hose can be less than 20 ml/m/hr, more particularly about 10 ml/m/hr, and more particularly from about 4 to about 8 ml/m/hr. In some embodiments, the permeability rate is reduced by an order of magnitude compared to traditional nylon hoses. The high pressure gas hose of the present invention can find practical application for use in natural gas transport, distribution, automotive applications, cooling and refrigeration applications, high pressure gas transport and/or distribution, and any other application in which it is desired to have low gas permeability in high pressure applications.

In one aspect, the present invention is directed to a high pressure hose for transporting pressurized gases in excess of 2000 psig. Generally, an embodiment of the high pressure hose can comprise an inner tube and an outer tube. The outer tube can be formed of a PTFE resin. The inner tube can be formed of a matrix of PTFE and graphene nano-platelets or nano-particles. In some embodiments, the matrix of PTFE and graphene nano-platelets can be defined continuously through an inner tube wall. In some embodiments, the inner tube wall and an outer tube wall can define a hose wall having a hose wall thickness. In some embodiments, the inner tube wall can have an inner tube wall thickness that comprise less than or equal to 15% of a hose wall thickness. In some embodiments, the matrix defines a tortuous path within the inner tube wall that reduces gas permeability of the pressurized gas through the inner tube wall. In some embodiments, the gas permeability of the high pressure hose is less than about 20 ml/m/hr, more particularly from about 1 to about 10 ml/m/hr, and more particularly from about 4 to about 8 ml/m/hr.

In one aspect, the present invention can be directed to a method of making a high pressure hose assembly for transporting pressurized gases in excess of 2000 psig. The method can comprise, for example, combining or blending PTFE resin and graphene nano-platelets or nano-particles to form a graphene/PTFE resin or matrix. The matrix or resin can include a concentration of graphene nano-platelets or particles to define a tortuous path within the matrix of inner tube. In some embodiments, a concentration of graphene nano-platelets or nano-particles is from about 0.5 to about 15 percent by weight of the resin, more particularly, from about 1 to about 10 percent by weight of the resin, and even more particularly from about 1.5 to about 5 percent by weight of the resin. The resin can contain optional additives, such as surfactants, fillers, and the like.

The resin is then extruded or molded to form an inner tube having graphene nano-platelets or nano-particles distributed therethrough. Optionally, an outer tube, such as a PTFE tube, is coextruded over the inner tube, forming a high pressure tube having a tube wall thickness. Typically, the high pressure tube is capable of safely handing high pressure gases in excess of 100 PSIG. In embodiments, the inner tube comprises from about 1 to about 100 percent of the total wall thickness, more particularly from about 1 to about 50% of the total wall thickness more particularly from about 5 to about 30 percent of the total wall thickness, and even more particularly about 15 percent of the total wall thickness. In an alternative embodiment, a single tube is extruded such that the graphene nano-platelets or nano-particles are distributed throughout 100 percent of the total wall thickness. Optionally, an outer sleeve or jacket is formed or coupled to an outer surface of the high pressure tube to at least partially circumferentially surround the PTFE tube. The jacket can be formed of a plurality of plaits of fiberglass lace, wires, yarns, mono- or micro-filaments, or a combination of these, for example, as described in WO 2013/0165452 A1, entitled "Tubes and Methods of Production of Use Thereof," incorporated herein by reference in its entirety.

In another aspect, the present invention can be directed to a method for transporting high pressure gasses. In a representative embodiment, the method can comprise pressurizing a gas to a pressure exceeding about 2000 PSIG followed by transporting the gas through a high pressure hose having an inner tube, an optional outer tube, and an optional jacket as described above. The method can further comprise forming the inner tube of a matrix of PTFE and graphene nano-platelets while the optional outer tube is formed of PTFE, as described above. In some embodiments, the matrix can be formed to define a tortuous path within the matrix of inner tube. In some embodiments, the matrix can be formed by combining the graphene nano-particles to the PTFE resin prior to formation of the inner tube. In some embodiments, the inner tube and the outer tube can be formed simultaneously. In some embodiments, the tortuous path within the matrix limits gas permeability through the high pressure hose to less that about 20 ml/m/hr, more particularly about 10 ml/m/hr, and more particularly from about 4 to about 8 ml/m/hr.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

A specific embodiment is now described by way of example to further the understanding of the present disclosure, with reference to the accompanying drawings in which:

FIG. 1 is a perspective view of a length of high pressure gas hose according to an embodiment of the present invention.

FIG. 2 is a section view of the high pressure gas hose taken at line 2-2 of FIG. 1

FIG. 3a is a detailed view of the high pressure gas hose of FIG. 1 taken at Detail 3 of FIG. 2.

FIG. 3b is a detailed view of a high pressure gas hose according to an alternative embodiment of the present invention.

FIG. 4 is a schematic illustration of a method of making a high pressure gas according to an embodiment of the present invention.

Figure 5:
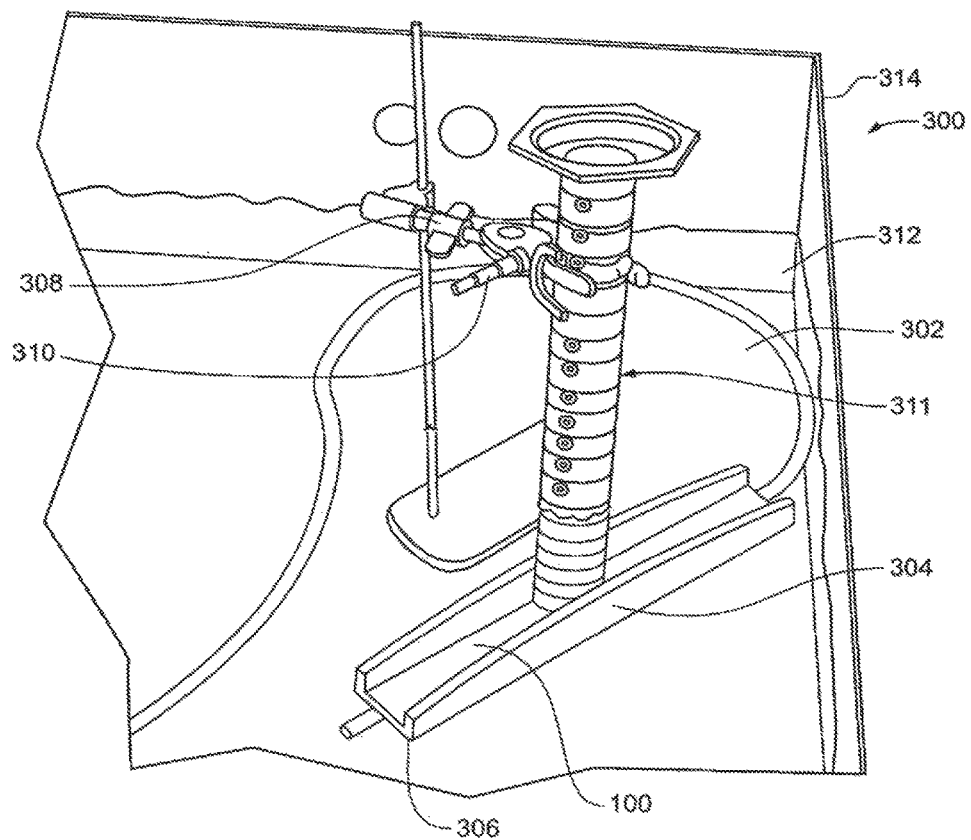
FIG. 5 is a perspective view of a permeability rate testing apparatus according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

A representative length of hose 100 according to an embodiment of the present invention is illustrated generally in FIGS. 1, 2, and 3a. Hose 100 is generally defined between a first end 102 and a second end 104. Hose 100 generally has a hose wall 106 defining a circular cross-section 108. Hose wall 106 is generally defined by an outer tube 110 and an inner tube 112. Hose wall 106 generally has a wall thickness 113 defined by an outer tube thickness 114 and an inner tube thickness 116. Hose 100 has a hose diameter 118 defined by the outer tube thickness 114, the inner tube thickness 116 and an internal diameter 120.

Hose 100 is generally formed by co-extruding the outer tube 110 and inner tube 112. Outer tube 110 is generally formed of a fluoropolymer 122, such as, for example, polytetrafluoroethylene (PTFE), perfluoroalkoxy copolymer (PFA) or fluorinated ethylene propylene (FEP), so as to be chemically resistant and compatible with environmental surroundings. In some embodiments, outer tube 110 can further include a braided or jacketed sleeve (not shown) to supply extra strength and support to hose 100. The sleeve can formed or coupled to an outer surface outer tube 110 to at least partially circumferentially surround outer tube 110 and inner tube 112. As discussed previously, the jacket can be formed, for example, of a plurality of plaits of fiberglass lace, wires, yarns, mono- or micro-filaments, or a combination of these as described in WO 2013/0165452 A1, entitled "Tubes and Methods of Production of Use Thereof," incorporated above by reference in its entirety.

As seen in FIG. 2, inner tube 112 is generally formed of a matrix 124 comprising PTFE 122 and graphene naonoparticles or nano-platelets 126. Graphene is a desirable material to blend with PTFE because of its similar aspect ratio to PTFE, allowing it blend easily. Furthermore, graphene is an efficient conductor of heat and electricity such that the inner tube 112 efficiently dissipates to avoid build up of electrical charge or heat, which can otherwise have potentially dangerous consequences. Particularly with respect to nano-platelets, the nano-platelets, due to their large surface area, create a sufficiently tortuous path for natural gas particles to escape, thereby significantly decreasing permeability of the tube. In addition, the nano-platelets or particles can provide other structure advantages including increasing the stiffness of the inner tube 112 as well as enhancing impact, mar and flame resistance.

The graphene nanoparticles or nano-platelets can be incorporated into the PTFE resin prior to the extrusion process. In some embodiments, a concentration of graphene nano-platelets or nano-particles is from about 0.5 to about 15 percent by weight of the matrix 124, more particularly, from about 1 to about 10 percent by weight of the matrix 124, and even more particularly from about 1.5 to about 5 percent by weight of the matrix 124. The matrix 124 can contain optional additives, such as surfactants, fillers, and the like.

Within the matrix 124, the graphene nanoparticles or nano-platelets 126 define a tortuous path 128 between an innermost surface 130 and an outermost surface 132. In embodiments, the inner tube comprises from about 1 to about 50 percent of the total wall thickness, more particularly from about 5 to about 30 percent of the total wall thickness. In one representative non-limiting embodiment, inner tube thickness 116 comprises 15% or less of the wall thickness 113.

In an alternative embodiment not shown, an inner tube is formed of PTFE, while an outer tube comprises the graphene nano-platelet or nano-particle matrix. In yet another embodiment shown in FIG. 3b, the hose comprises a single tube 112 formed from the graphene nano-platelet or particle matrix 124 forming the entire thickness of the hose wall.

In operation, hose 100 can be utilized for transporting gas at pressures exceeding about 2000 psig. A representative method 200 for making a high pressure gas hose is illustrated generally in FIG. 4 and can comprise a blending step 202 in which a PTFE resin is blended with the nano-particles or nano-platelets, such as by metering, at concentrations described above using a ribbon blender, paddle mixer, baffles, V-blenders, rolling mixers or any of a variety of blending techniques known in the art.

Paste extruded PTFE blends are formed into a billet or preformed and extruded into a tubular shape and heated to dry any lubricant the heat is then increased until the material sinters at temperature of 600-700° F.

The melt extrudable polymers of PFA blends, FEP blends, and/or PTFE blends are heated at step 204 to temperatures of 600-700° F. (melting temperature of PTFE is about 620.3° F.) such that the resin is flowable. The flowable resin is then extruded or molded during a formation step 206 in which the inner tube 112 is formed such that the matrix 124 is defined continuously through the inner tube thickness 116. The formation step 206 can include forming the inner tube thickness 116 such that the inner tube thickness 116 is from about 1 to about 100 percent of the total wall thickness 113, more particularly from about 5 to about 30 percent of the total wall thickness 113, and even more particularly about 15 percent of the total wall thickness 113.

In some embodiments, the tortuous path 128 can be created by adding the graphene nano-particle 128 to the PTFE resin 122 prior to the formation step 206. In some embodiments, the method can include a formation step 208 in which the outer tube 110 is formed of a PTFE resin extruded or molded over outer surface of inner tube 112. In some embodiments, formation step 206 and formation step 208 can be accomplished simultaneously, for example, through simultaneous extrusion of the inner tube 112 and outer tube 110 to form hose 100. Optional step 210 includes coupling a sleeve or jacket, such as a braided fiberglass lace, wires, yarns, mono- or micro-filaments, or a combination of these to form a jacket as described above, over an outer periphery of outer tube 110. In some embodiments, the method 200 results in hose 100 having a gas permeability of less than about 20 ml/m/hr, more particularly about 10 ml/m/hr, and more particularly from about 4 to about 8 ml/m/hr.

Hose 100 can be used in a variety of applications in which it is desirable to transport and/or distribute gas at high pressures. For example, hose 100 can find practical application for use in natural gas transport or distribution, automotive applications, cooling and refrigeration applications, and other applications in which it is desired to have low gas permeability in high pressure applications. Hose 100 generally satisfies a variety of standards for the transportation of high pressure gas, such as, for example, various ASTM and ANSI standards including, for example, ANSI/CSA NGV-3.1 and ANSI/CSA NGV-4.2 for vehicles fueled by natural gas. Use of hose 100 can be especially beneficial in the transport of flammable gasses or gas mixtures such as, for example, natural gas lines and oxygen service lines.

Permeation Testing

In order to verify the advantages of the presently claimed invention, a series of tests were conducted to compare the performance of hose 100 to conventional products. In conducting the tests, a testing apparatus 300 as illustrated in FIG. 5 was constructed. Testing apparatus 300 generally comprises a liquid bath 302 including a mounting assembly 304. Mounting assembly 304 generally comprises a lower mounting member 306, a positioning member 308 and a clamp assembly 310 and a graduated cylinder 311. Liquid bath 302 is generally filled with a suitable liquid 312 such as, for example, water. A length of hose 100 has the first end 102 plugged with second end 304 being fluidly coupled to a high pressure gas source. Hose 100 is filled with a pressurized gas 316 and allowed to normalize and come to equilibrium within the liquid bath 302 for a period of at least 72 hours. Using positioning member 308 and hose clamp assembly 310, the graduated cylinder 311 is positioned upside down within the liquid bath 302 below a surface 314 of the liquid 312 such that the graduated cylinder 311 is filled with liquid 312 and is positioned over the hose 100. Amounts of pressurized gas 316 that escape from the filled hose 100 are captured and retained within the graduated cylinder wherein the volume can be measured over a period of time so as to come up with a diffusion rate.

In conducting the testing, three different samples of hose 212 were evaluated. The testing was conducted at ambient temperature (25° C.). Hose 212 was filled with pressurized gas 316 at 3400 psig. Pressurized gas 316 generally comprised dry nitrogen. Each hose 100 had a length of 0.33 m. The results of the testing were as contained in Table 1 below:

TABLE 1

| Tubing Description | Start Time | Finish Time | Elapsed Time (hours) | Gas Collected (ml) | Permeation Rate (ml/m/hr) |
|---|---|---|---|---|---|
| PTFE with 5% Nano Platelets with cb conductive line | 8:58 | 12:05 | 4.12 | 6 | 4.6 ml/m/hr |
| Post sinter air cooled (PTFE, no nano-platelets) | 13:47 | 16:40 | 2.88 | 14 | 15.4 |
| Highly Crystalline PTFE Oven cooled (PTFE, no nano-platelets) | 7:42 | 10:48 | 3.10 | 21 | 21.7 |

While a specific embodiment has been described above by way of illustration, it will be appreciated that the described principles are equally applicable to a wide range of popcorn popper products and configurations. More generally, numerous adaptations, modifications, combinations and juxtapositions of the features described above may be made without departing from the principles of the presently disclosed invention.

The invention claimed is:

1. A high pressure gas hose, comprising:
   an inner tube; and
   an outer tube formed of PTFE, the outer tube surrounding the inner tube,
   wherein the inner tube is formed of a matrix of PTFE and graphene nano-platelets, wherein the matrix is defined continuously through an inner tube wall, and
   wherein a permeability of the hose is less than about 20 ml/m/hr.

2. The high pressure gas hose of claim 1, wherein the inner tube wall of the inner tube and an outer tube wall of the outer wall together define a hose wall having a hose wall thickness, and wherein an inner tube wall thickness is from about 1 to about 99.9% of the hose wall thickness.

3. The high pressure gas hose of claim 2, wherein the inner tube wall thickness is from about 5 to about 30% of the hose wall thickness.

4. The high pressure gas hose of claim 3, wherein the inner tube wall thickness is about 15% of the hose wall thickness.

5. The high pressure gas hose of claim 1, wherein the gas permeability is from about 1 to about 10 ml/m/hr.

6. The high pressure gas hose of claim 5, wherein the gas permeability is from about 4 to about 8 ml/m/hr.

7. The high pressure gas hose of claim 1, wherein the inner tube comprises a concentration of graphene nano-platelets in a range of about 0.5 to about 15 percent by weight of the matrix.

8. The high pressure gas hose of claim 7, wherein the concentration of graphene nano-platelets is in a range of about 1 to about 10 percent by weight of the matrix.

9. The high pressure gas hose of claim 8, wherein the concentration of graphene nano-platelets is in a range of about 1.5 to about 5 percent by weight of the matrix.

10. A method for making a high pressure gas hose, the method comprising:
    combining PTFE resin and a concentration of graphene nano-platelets to form a PTFE/graphene nano-platelet resin; and
    forming an inner tube of the hose from the PTFE/graphene nano-platelet resin, the inner tube having an inner tube wall thickness; and
    forming and an outer tube of the hose over the inner tube from a PTFE resin, the outer tube having an outer tube wall thickness.

11. The method of claim 10, wherein the concentration of graphene nano-platelets in a range of about 0.5 to about 15 percent by weight of the resin.

12. The method of claim 11, wherein the concentration of graphene nano-platelets in a range of about 1 to about 10 percent by weight of the resin.

13. The method of claim 12, wherein the concentration of graphene nano-platelets in a range of about 1.5 to about 5 percent by weight of the resin.

14. The method of claim 10, wherein the inner tube wall thickness and the outer tube wall thickness define a hose wall thickness, and wherein an inner tube wall thickness is from about 1 to about 100% of the hose wall thickness.

15. The method of claim 14, wherein the inner tube wall thickness is from about 5 to about 30% of the hose wall thickness.

16. The method of claim 15, wherein inner tube wall thickness is about 15% of the hose wall thickness.

17. The method of claim 10, wherein forming the inner tube comprises extruding the PTFE/graphene nano-platelet resin.

18. The method of claim 17, wherein forming the outer tube comprises extruding a PTFE resin, and wherein the outer tube and the inner tube are co-extruded simultaneously.

19. The method of claim 10, wherein a gas permeability of the hose is less than about 20 ml/m/hr.

20. The method of claim 19, wherein the gas permeability is from about 1 to about 10 ml/m/hr.

21. The method of claim 20, wherein the gas permeability is from about 4 to about 8 ml/m/hr.

22. The method of claim 10, further comprising:
    coupling a braided jacket to an outer surface of the outer tube, the braided jacket including multiple layers of fiberglass lace, metal wires, yarns, microfilaments, or monofilaments, or combinations thereof.

23. A high pressure gas hose, comprising:
    an extruded fluoropolymer tube defining a tube wall, the tube wall including a matrix of fluoropolymer and graphene nano-platelets, wherein the matrix is defined continuously through the tube wall such that the hose has a gas permeability of less than about 20 ml/m/hr.

* * * * *

UNITED STATES PATENT AND TRADEMARK OFFICE
CERTIFICATE OF CORRECTION

PATENT NO.        : 9,688,011 B2
APPLICATION NO.   : 14/334228
DATED             : June 27, 2017
INVENTOR(S)       : Rooke et al.

It is certified that error appears in the above-identified patent and that said Letters Patent is hereby corrected as shown below:

In the Claims

<u>Claim 10, Column 7, Line 26</u>:
After "forming" delete "and".

Signed and Sealed this
Eighth Day of August, 2017

Joseph Matal
*Performing the Functions and Duties of the
Under Secretary of Commerce for Intellectual Property and
Director of the United States Patent and Trademark Office*